United States Patent
Groliere

(10) Patent No.: US 7,043,092 B1
(45) Date of Patent: May 9, 2006

(54) VIDEO DECODING DEVICE AND METHOD USING A DEBLOCKING FILTERING STEP

(75) Inventor: Françoise Groliere, Nogent-sur-Marne (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/500,304

(22) Filed: Feb. 8, 2000

(30) Foreign Application Priority Data

Feb. 16, 1999 (EP) .................................. 99400367

(51) Int. Cl.
*G06K 9/40* (2006.01)

(52) U.S. Cl. ........................ 382/268; 382/275; 382/260

(58) Field of Classification Search ................ 382/268, 382/233, 266, 264, 260, 275; 375/240.29, 375/240.24; 348/420.1; 358/426.01
See application file for complete search history.

(56) References Cited

U.S. PATENT DOCUMENTS

| | | | | |
|---|---|---|---|---|
| 5,337,088 A | * | 8/1994 | Honjo | 375/240.24 |
| 5,796,875 A | * | 8/1998 | Read | 382/268 |
| 6,236,764 B1 | * | 5/2001 | Zhou | 382/268 |

FOREIGN PATENT DOCUMENTS

| | | |
|---|---|---|
| EP | 0859518 A1 | 8/1998 |
| JP | 11205792 | 7/1999 |
| WO | WO9841025 | 9/1998 |

* cited by examiner

*Primary Examiner*—Vikkram Bali
*Assistant Examiner*—Colin LaRose

(57) ABSTRACT

Quantization in video coding is a lossy treatment and has as its main result that blocking artefacts occur at the boundary of two blocks during the decoding process. The invention relates to a method of removing these blocking artefacts. It implements a filtering step in the decoding process applied to a segment of pixels phaddling the boundary, which segment has pixels at the ends (R3, L3) that agree with a chrominance similarity criterion (step 1), i.e. filtering is applied to segments for which the pixels at the ends have similar colors.

6 Claims, 4 Drawing Sheets

L6 L5 L4 L3 L2 L1 ┆ R1 R2 R3 R4 R5 R6

VIDEO DECODING DEVICE AND METHOD USING A DEBLOCKING FILTERING STEP

The present invention relates to a method of decoding data representing a sequence of pictures previously divided into blocks and coded, comprising, for each successive picture, at least the steps of:

decoding said data;

filtering the decoded data;

said filtering step being applied to at least one pixel component of a selected segment of consecutive pixels located on a single line or column of the current picture and on both sides of a boundary between two blocks, so that the boundary divides the segment into two parts.

The invention also relates to a corresponding device. This invention may be used particularly in low bit rate applications such as videophony or videoconferencing.

Coding a sequence of pictures comprises different steps. Each picture is composed of a bidimensional array of picture elements or pixels, each of them having luminance and chrominance components. In order to be encoded, the picture is subdivided into blocks of pixels. A discrete cosine transform (DCT) is applied to each block of the picture. The coefficients obtained from this DCT are rounded to the closest value given by a fixed quantization law and then quantized, depending on the spatial frequency within the block that they represent. In data transmission, quantization is one of the steps for data compression and is a lossy data treatment.

During decoding, the data are successively treated by inverse quantization and inverse discrete cosine transform, and finally filtered before being displayed.

The quantization errors introduced by the quantization of the DCT coefficients in the coding process have as their main result that blocking artefacts occur at the boundary of two blocks. Since each block is treated separately during coding, the coefficients obtained from the DCT are indeed quantized differently for the two blocks. Visually, a kind of grid appears on the decoded image. The spatial grid pattern of blocks that was introduced only for the purpose of data compression becomes distinguishable in the displayed decoded picture. After decoding, the image quality of the picture is strongly degraded.

International patent application WO 98/41025 discloses a method of removing blocking artefacts based on the image content of the frame in the environment of the block boundary. The number of pixels to be examined and filtered depends, for instance, on tonal value change among pixels and the size of the quantisation step.

It is an object of the invention to improve the image quality of a decoded picture by proposing another type of method of reducing blocking artefacts that occur at the boundary of two blocks.

To this end, the invention relates to a decoding method as defined in the preamble of the description, wherein said filtering step is applied only if the two pixels at the ends of said segment have chrominance components that agree with a similarity criterion.

The invention therefore comprises the definition of a conditional filtering step. This decoding method is a good trade-off between efficiency and complexity. Filtering is only performed on two adjacent blocks having chrominance components which are close enough to each other, i.e. the blocks have similar colors near their boundary.

More precisely, said filtering step comprises the sub-steps of:

comparing the respective chrominance components of the two pixels;

filtering only if the difference between said respective chrominance components is lower than a predetermined threshold.

These sub-steps of comparing of the difference of the two chrominance components with a predetermined threshold and corresponding decision allow a simple implementation of the criterion.

In improved embodiments, further conditions on the pixel chrominance values or conditions on the luminance values can be added to the method. The mentioned filtering step is then aimed at eliminating blocking artefacts as much as possible while preserving image sharpness and details.

To carry out the method, the invention also relates to a device for decoding data corresponding to a sequence of pictures previously divided into blocks and coded, comprising means for decoding and means for filtering a selected segment of consecutive pixels located on both sides of any boundary between two blocks, with at least one pixel on each side of the boundary, wherein the device also comprises switching means for replacing said filtering means by a direct connection if the two pixels at the ends of said segment have chrominance components that do not agree with a similarity criterion.

The particular aspects of the invention will now be explained with reference to the embodiments described hereinafter and considered in connection with the accompanying drawings, in which.

Figures 1, 2:
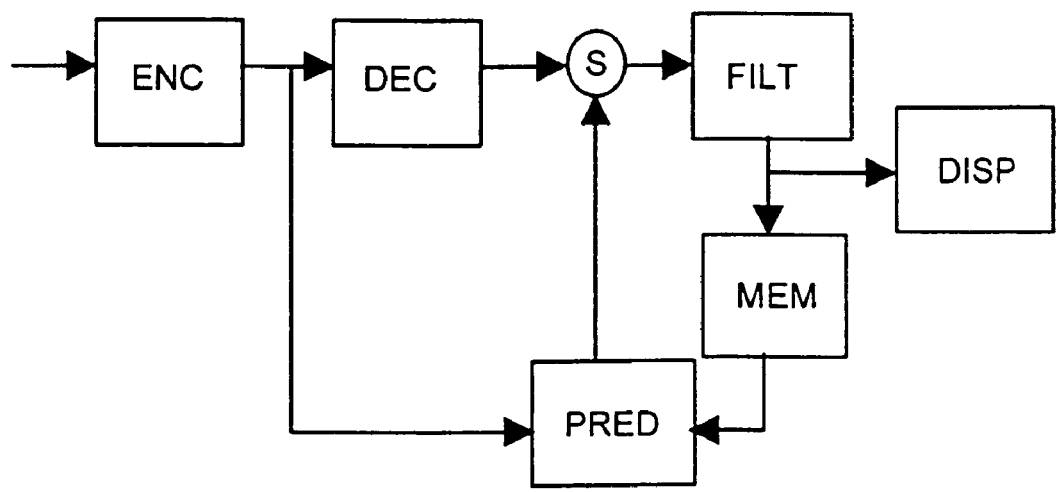
FIG. 1 depicts a prior art decoding device including a filtering circuit for the pictures to be displayed.
FIG. 2 represents a segment of consecutive pixels straddling a block boundary in the method according to the invention.

An example of a decoding device according to the prior art is shown in FIG. 1. An encoding channel ENC, where each picture is divided into blocks of pixels and encoded, receives a sequence of pictures. The encoding channel ENC usually employs discrete cosine transform and quantization in order to provide data in a compressed form. The coded picture is directed to a decoder DEC, which produces a decoded differential picture. This differential decoded picture is summed in an adder S with the prediction picture, issued from the prediction stage PRED and formed on the basis of a previous picture, this sum resulting in a decoded picture. This decoded picture is directed to a filter FILT and, after filtering, supplied to a screen display DISP and simultaneously stored in a picture memory MEM. For decoding the next picture, the one stored in the picture memory is read as a reference picture and transformed into a new prediction picture in the prediction stage PRED.

FIG. 2 illustrates the position of a segment of 12 selected pixels on both sides of a vertical block boundary. In the considered segment, the pixels belonging to the left block are called L1, L2, L3 and so on, according to their distance to the boundary. Similarly, the pixels belonging to the right block are called R1, . . . ,R6. The number of considered pixels is arbitrary and the segment is not necessarily symmetrical in relation to the boundary. The boundary divides the segment into two parts, each part belonging to one of the blocks. It is also within the scope of the invention to consider pixels on a single column straddling a horizontal boundary between two blocks located on two adjacent lines of blocks.

Due to the above-mentioned quantization process, the pixels from the right and left blocks may be different after decoding, even if they were similar in the original picture. A filter applied to the pixels located on each side of the boundary cancels or reduces this difference.

However, if this filtering step is carried out without any discrimination on a boundary, fine details located at its vicinity may disappear, a blurred picture then being obtained. According to the invention, a criterion is chosen to determine what boundaries must indeed be filtered. To this end, it is assumed that two different objects can be best differentiated by their colors and, as a result, filtering is performed when one object only is detected on both sides of the boundary of two blocks.

Figure 3:
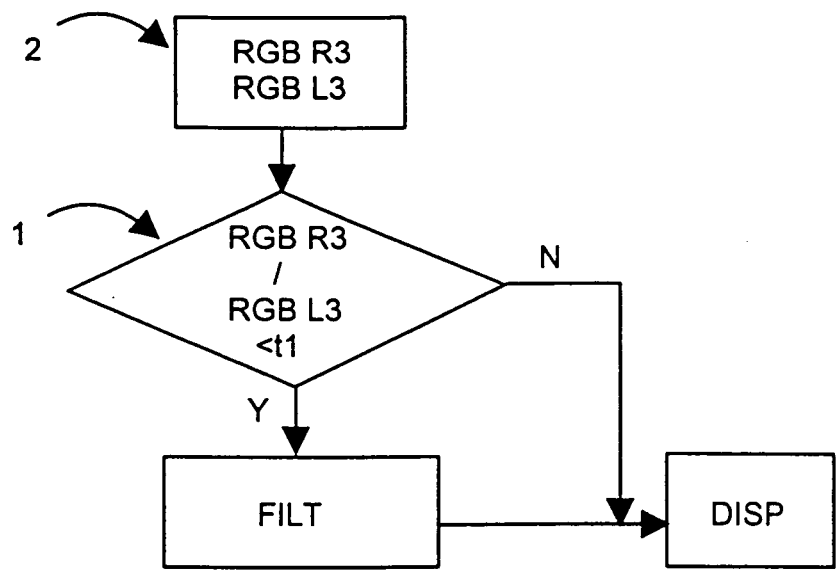
FIG. 3 shows a flow chart of a decoding method according to the present invention.

According to the present invention, said filtering step is applied only if the two pixels at the ends of said segment have chrominance components that agree with a similarity criterion. FIG. 3 shows a flow chart of the steps of a decoding method integrating a simple similarity criterion. This similarity criterion allows classification of the blocks in two categories: the ones that have to be filtered and the ones that do not have to be filtered. The method based on FIG. 3 is applied to a segment of 6 consecutive pixels {L3, L2, L1, R1, R2, R3} when using the indices of FIG. 2. The similarity criterion is based on the chrominance components R, G, B of the two pixels R3, L3 at the ends of the segment. A step 2 consists of evaluating the chrominance components R, G, B of R3 and L3 and then a subsequent step 1 of comparing the difference of these components with a given threshold t1. If the difference is greater than t1, filtering is not performed, otherwise filtering is performed on all the pixels of the segment. Filtering may consist of an update of the luminance components of all the pixels of the segment. If an update is decided, the pixels L2, L1, R1, R2 are computed again by a simple linear interpolation between L3 and R3. This way of updating is by no means a limitation of the invention.

Figure 4:
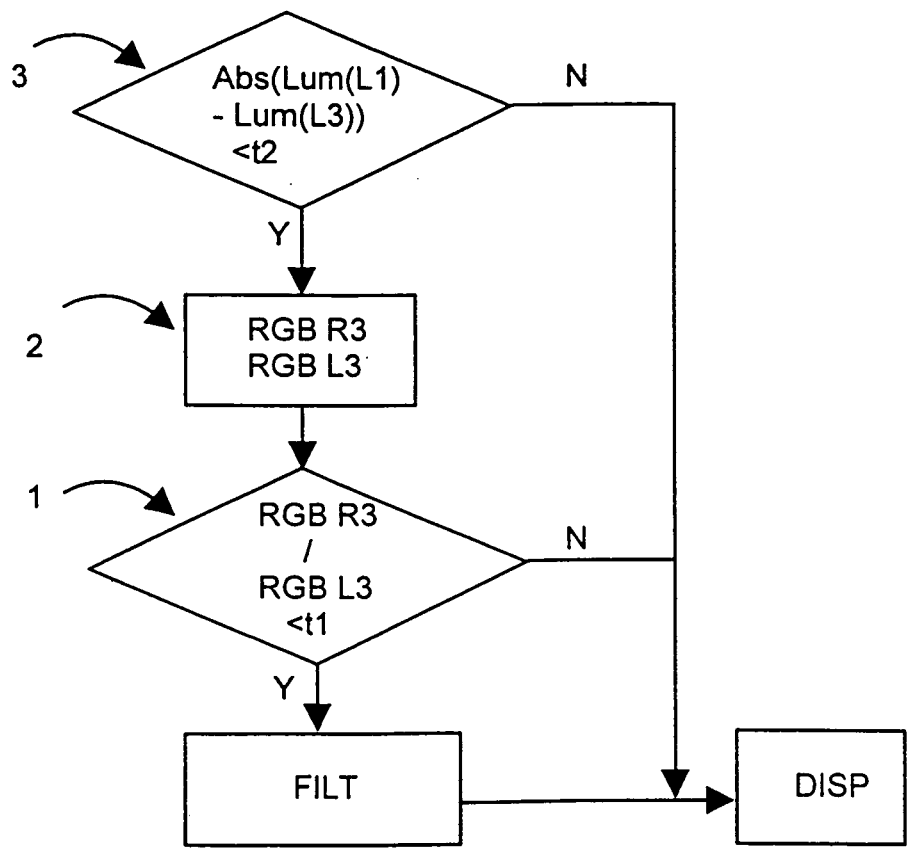
FIG. 4 shows an improved flow chart of a decoding method according to the present invention.

This method can be improved by adding another condition to the filtering step. FIG. 4 shows a flow chart of an improved implementation of the method according to the invention. Said filtering step is now applied only if the two pixels at the ends of one of the parts of said segment have luminance components that agree with a similarity criterion. This criterion allows detection of a fine detail that may exist in one block at the border with the other block. The criterion used in the implementation of the method illustrated in FIG. 4 consists, in a step 3, of a comparison of the absolute value of the difference of the luminance of L1 and L3 with a predetermined threshold t2. Thus, step 3 is performed and, if L1 and L3 agree with said criterion, step 2 and finally step 1 are performed. FIG. 4 shows a way of implementing the method step 3 placed before the pair {step2, step1}. It should be noted that another method may be performed the other way round (step 2, step 1 followed by step3). Moreover, this criterion applied to the pixels of the left block can only be applied, either way, to the pixels of the right block only or to both blocks concerned.

Figure 5:
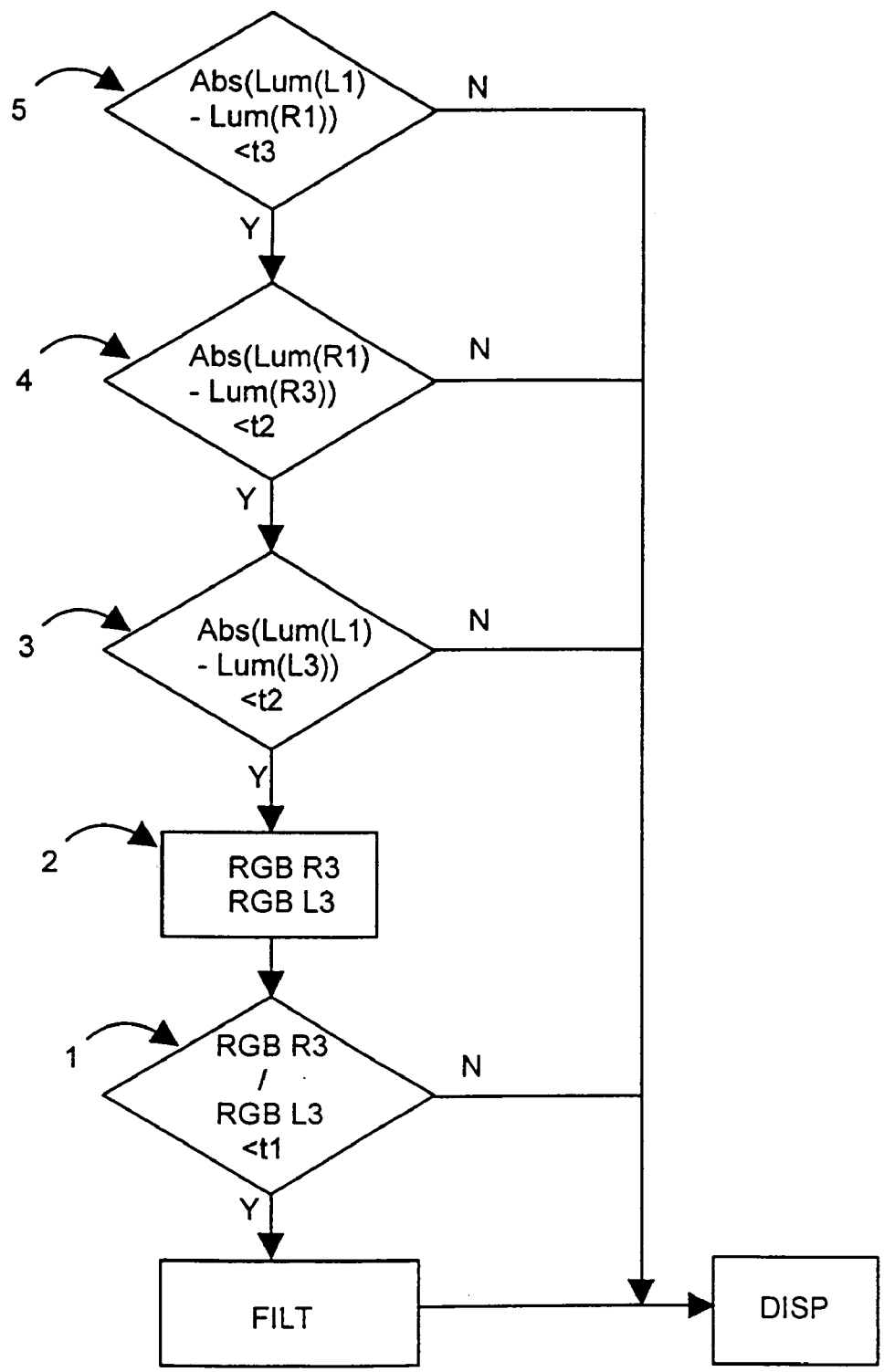
FIG. 5 shows an improved flow chart of a decoding method according to the present invention.

Referring to FIG. 5, the filtering step is now applied only if the two consecutive pixels of said segment located on each side of the boundary have luminance components that agree with a similarity criterion. A step 5 is added to the method described above. This step consists of comparing the absolute value of the difference of the luminance values of the two pixels L1, R1 located on each side of the boundary. This new condition prevents filtering of the two blocks if the difference between the two blocks is not due to a blocking artefact but to the presence of a detail at the boundary. FIG. 5 comprises this new step 5, the steps 1, 2, 3 described previously and a step 4 corresponding to step 3 performed in the same way on the right block. Again the order of implementation of the steps of the method is totally arbitrary.

When the decision to filter is taken, updating is performed on the luminance components. However, updating can be alternatively carried out on the chrominance components.

Figure 6:
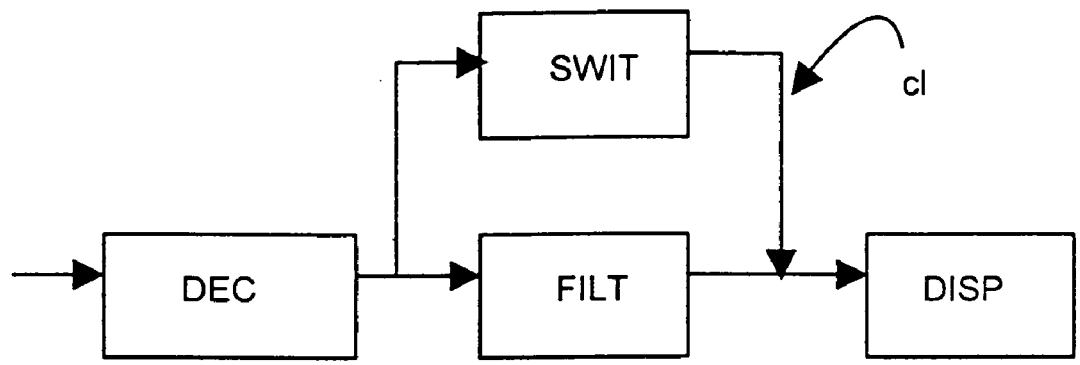
FIG. 6 depicts a decoding device including a filtering circuit for carrying out a method according to the invention.

FIG. 6 shows a block diagram of an embodiment of a decoding device according to the present invention. The device comprises a decoder DEC that receives coded data as a bitstream from an encoder ENC and, placed at the output of the decoder DEC, filtering means FILT for removing errors resulting from data compression. To carry out a method according to the invention, the decoding device also comprises switching means SWIT for replacing the filtering means FILT by a direct connection when, according to the invention, the decision not to filter is taken. The switching means SWIT are placed parallel to the filtering means FILT and, according to the digital data received from the decoder DEC, establish a direct connection via the connecting line c1 when necessary, while the filtering means FILT are no longer connected if said direct connection is established.

What is claimed is:

1. A device for decoding data corresponding to a sequence of pictures previously divided into blocks and coded, comprising means for decoding the coded data and means for filtering a selected segment of at least three consecutive pixels located on a single line or column of the current picture and on both sides of boundary between two blocks, so that the boundary divides the segment into two parts, wherein the device also comprises switching means for replacing said filtering means by a direct connection if the two pixels at the ends of said segment have chrominance components that do not agree with a similarity criterion.

2. The device as claimed in claim 1, configured such that said filtering is applied only if the two pixels at the ends of a part of said segment have luminance components that agree with a similarity criterion, said part having at least two pixels.

3. A method of decoding data representing a sequence of pictures previously divided into blocks and coded, comprising, for each successive picture, at least the steps of:

decoding said data;

filtering the decoded data;

said filtering step being applied to at least one pixel component of a selected segment of at least three consecutive pixels located on a single line or column of the current picture and on both sides of a boundary between two blocks, so that the boundary divides the segment into two parts, wherein said filtering step is applied only if the pixels at the ends of said segment have chrominance components that agree with a similarity criterion.

4. The decoding method as claimed in claim 3, wherein the filtering step comprises the sub-steps of:

comparing the respective chrominance components of the two pixels;

filtering only if the difference between said respective chrominance components is lower than a predetermined threshold.

5. The decoding method as claimed in claim 3, wherein said filtering step is applied only if the two consecutive pixels of said segment located on each side of the boundary have luminance components that agree with a similarity criterion.

6. The decoding method as claimed in claim 3, wherein said segment is a segment of at least four consecutive pixels, each of the two parts having at least two pixels, and wherein said filtering step is applied only if, for each of the two parts, the two pixels at the ends of the part have luminance components that agree with a similarity criterion.

* * * * *